US008264805B2

(12) United States Patent
Norman

(10) Patent No.: US 8,264,805 B2
(45) Date of Patent: Sep. 11, 2012

(54) DUAL VOLTAGE HOT SWAP MODULE POWER CONTROL

(75) Inventor: Charles E. Norman, Nepean (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/176,304

(22) Filed: Jul. 5, 2011

(65) Prior Publication Data

US 2011/0261493 A1 Oct. 27, 2011

Related U.S. Application Data

(63) Continuation of application No. 12/974,113, filed on Dec. 21, 2010, now Pat. No. 7,995,317, which is a continuation of application No. 11/553,937, filed on Oct. 27, 2006, now Pat. No. 7,889,472.

(51) Int. Cl.
*H02H 3/08* (2006.01)
*H02H 3/24* (2006.01)
*H02H 9/02* (2006.01)

(52) U.S. Cl. ............. 361/58; 361/57; 361/94; 361/93.1; 361/90; 327/309

(58) Field of Classification Search ............... 361/58, 361/57, 94, 93.1, 90, 92; 327/309
See application file for complete search history.

(56) References Cited

U.S. PATENT DOCUMENTS

| | | | |
|---|---|---|---|
| 3,711,761 A * | 1/1973 | Watson | ..................... 327/463 |
| 5,374,887 A | 12/1994 | Drobnik | |
| 5,920,186 A | 7/1999 | Ninh et al. | |
| 6,462,924 B1 | 10/2002 | Watanabe et al. | |
| 6,657,475 B1 | 12/2003 | Zahn | |
| 6,735,064 B2 | 5/2004 | Miyazaki | |
| 6,879,115 B2 | 4/2005 | Ribarich | |
| 7,259,971 B1 | 8/2007 | Allen et al. | |
| 7,545,131 B1 | 6/2009 | Alexander | |
| 7,889,472 B1 | 2/2011 | Norman | |
| 2011/0089924 A1 | 4/2011 | Norman | |

OTHER PUBLICATIONS

"U.S. Appl. No. 11/553,937, Appeal Brief filed Apr. 12, 2010", 19 pgs.
"U.S. Appl. No. 11/553,937, Decision on Pre-Appeal Brief Request mailed Mar. 11, 2010", 2 pg.
"U.S. Appl. No. 11/553,937, Examiner Interview Summary mailed Sep. 2, 2010", 3 pgs.
"U.S. Appl. No. 11/553,937, Final Office Action mailed Oct. 22, 2009", 12 pgs.
"U.S. Appl. No. 11/553,937, Non-Final Office Action mailed Feb. 26, 2009", 10 pgs.
"U.S. Appl. No. 11/553,937, Non-Final Office Action mailed May 27, 2010", 14 pgs.
"U.S. Appl. No. 11/553,937, Notice of Allowance mailed Sep. 24, 2010", 10 pgs.
"U.S. Appl. No. 11/553,937, Pre-Appeal Brief Request mailed Jan. 22, 2010", 3 pgs.

(Continued)

*Primary Examiner* — Rexford Barnie
*Assistant Examiner* — Zeev V. Kitov
(74) *Attorney, Agent, or Firm* — Meyertons, Hood, Kivlin, Kowert & Goetzel, P.C.

(57) ABSTRACT

A module hot swap circuit includes a low voltage-drop rectifier adapted to receive either positive or negative voltages of different absolute values. The rectifier is coupled to a power manager that provides dual startup/shutdown voltage thresholds and inrush current limiting. A detector prevents reverse current flow allowing the module to hold up during input voltage drop-outs.

17 Claims, 4 Drawing Sheets

OTHER PUBLICATIONS

"U.S. Appl. No. 11/553,937, Response filed Jun. 26, 2009 to Non-Final Office Action mailed Feb. 26, 2009", 7 pgs.

"U.S. Appl. No. 11/553,937, Response filed Aug. 27, 2010 to Non Final Office Action mailed May 27, 2010", 7 pgs.

"U.S. Appl. No. 12/974,113, Notice of Allowance mailed Apr. 4, 2011", 9 pgs.

"Input Bridge CR3 50WQ10FN", dated prior to Oct. 27, 2006, 1 page.

* cited by examiner

DUAL VOLTAGE HOT SWAP MODULE POWER CONTROL

CLAIM OF PRIORITY

This application is a Continuation of and claims the benefit of priority under 35 U.S.C. §120 to U.S. patent application Ser. No. 12/974,113, filed on Dec. 21, 2010, and now issued as U.S. Pat. No. 7,995,317, which is a Continuation of and claims the benefit of priority under 35 U.S.C. §120 to U.S. patent application Ser. No. 11/553,937, filed on Oct. 27, 2006, now issued as U.S. Pat. No. 7,889,472, the benefit of priority of each of which is claimed hereby, and each of which are incorporated by reference herein in its entirety.

BACKGROUND

In many telecom and information technology applications, hot pluggable modules are desired. A hot pluggable module is an electronic module that provides any number of different functions, but which can be plugged into a system without removing power from the system. In other words, it can be inserted into a hot or powered receptacle that is designed to couple the module to the system.

Modules for telecom applications may need to operate from either a +24 volt or −48 volt power supply provided at the receptacle and therefore need to correct the polarity of the supply. They should exhibit minimum power losses or heat dissipation, and should provide for dual voltage (24 and 48) start-up/shutdown threshold control. Such modules should also provide some form of start-up delay and should control or limit their inrush current. Further, the modules should hold up during supply drop-out; that is, block reverse current flow.

Existing power input circuits for modules can be quite complex, yet do not provide all of these desired features.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
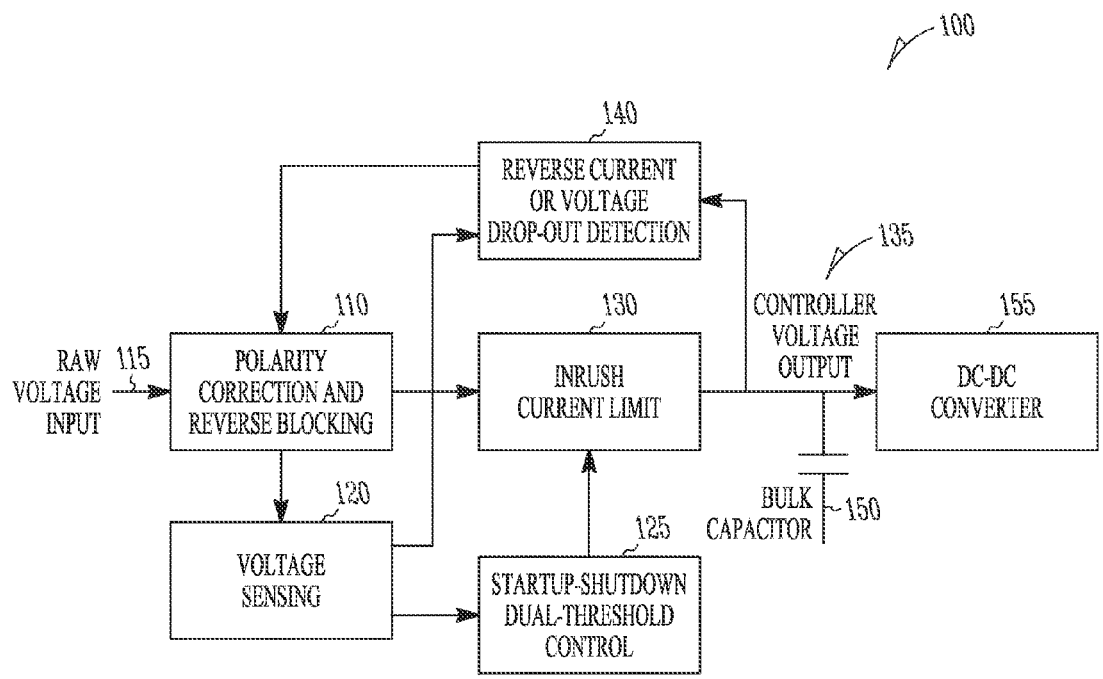
FIG. 1 is a simplified block diagram showing functional elements of a circuit for providing hot swapping of modules for dual supplies according to an example embodiment.

FIG. 1 is a block diagram showing functional elements of a circuit 100 for providing hot swapping of modules into dual supplies according to an example embodiment. In one embodiment, the hot swap circuit includes a rectifier 110 adapted to receive either positive voltage or a negative voltages of different absolute values at input 115. A voltage sensor 120 is coupled to the controller 125, which provides dual startup/shutdown voltage thresholds and controls inrush current limiting 130, to provide power to an output 135, which is normally a DC-DC converter 155 and a bulk energy storage capacitor 150. A detector 140, or comparator, detects input voltage drop-outs and shuts off the rectifier 110 to prevent reverse current flow.

In one embodiment, the rectifier comprises a FET bridge that is adapted to receive input voltages of approximately 24 volts and −48 volts. Other voltages may also be received in further embodiment. In one embodiment, the detector 140 shuts off the FET bridge 110 as a function of detected reverse current flow or input voltage drop-out.

Figure 2:
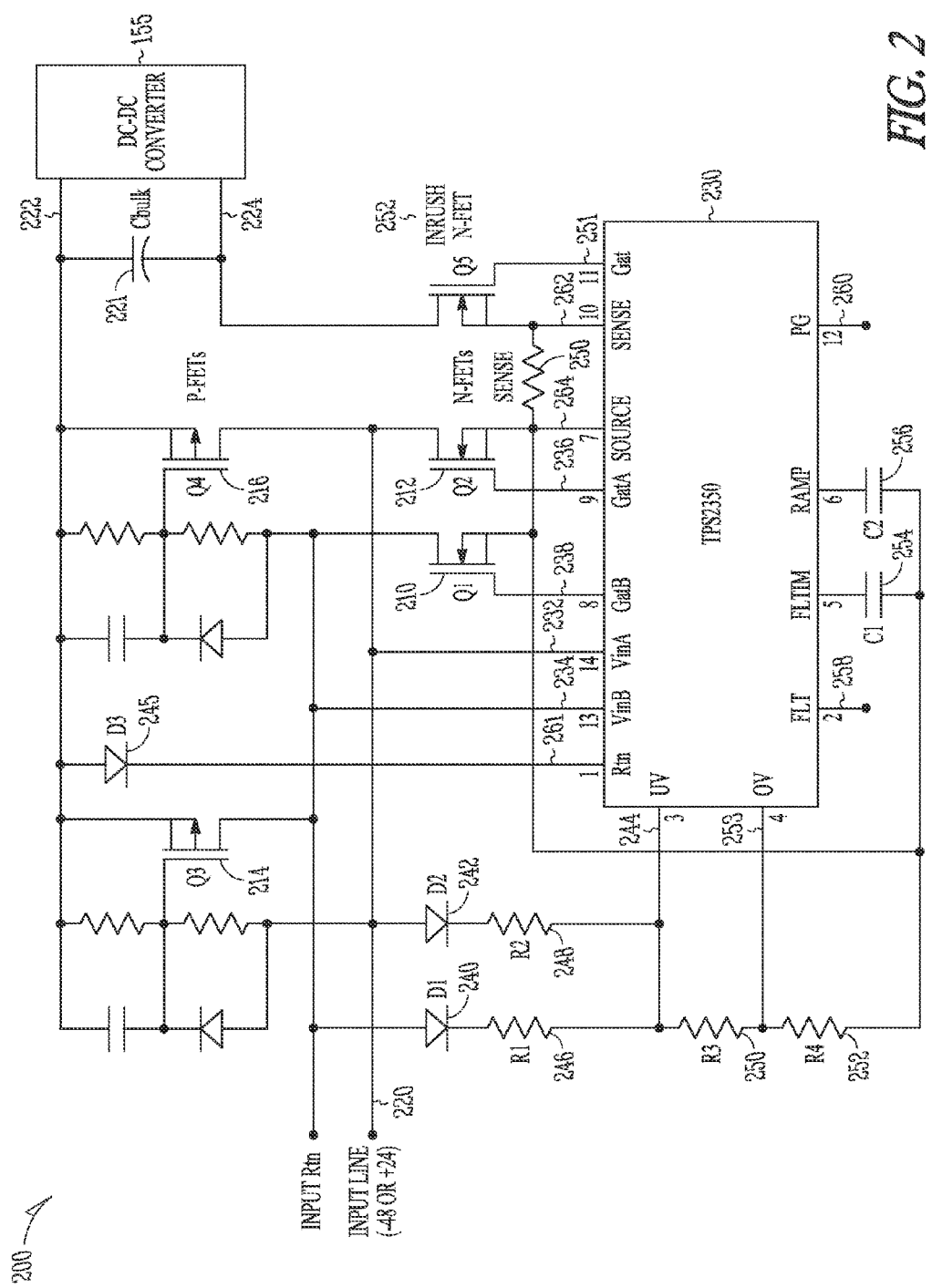
FIG. 2 is a circuit diagram illustrating most of the circuit of FIG. 1 according to an example embodiment.

FIG. 2 is a circuit diagram illustrating the circuit of FIG. 1 according to an example embodiment. In one embodiment, body diodes of FETs 210-Q1, 212-Q2, 214-Q3 and 216-Q4, act as a bridge rectifier to correct the polarity of an incoming supply 220. The corrected polarity enables a downstream DC-DC converter 155 coupled to a bulkstorage capacitor 221 and output lines 222, 224 to see only positive voltages. In one embodiment, passive components around the p-FETs turn ON whichever of FETs 214-Q3 or 216-Q4 is the correct polarity, to reduce its voltage drop.

The bridge is coupled to a hot-swap chip 230, such as TPS2350 released by Texas Instruments in 2005, but other chips may be suitable, such as one provided by Maxim. The hot-swap chip 230 selects whichever supply line to the chip (232-A or 234-B) has the higher voltage and turns on its n-FET, Q1 or Q2 (in this circuit the other line will have zero volts) via gate A-236 and gate B-238 control lines, thereby reducing its voltage drop. Whichever supply line 232, 234 is higher also feeds through diodes D1-240 or D2-242 to a voltage threshold detect input 244 of the hot-swap chip 230. In one embodiment, a diode D3-245 provides a positive voltage supply to the hot swap chip (18 to 60V).

A voltage divider network of resistors R1-246, R2-248, R3-250 and R4-252 is designed such that the start-up and shut-down thresholds can be set to appropriate levels for both +24 and −48V supplies. When the input exceeds 1.4 Vdc at pin 244 in one embodiment, the hot swap chip 230 decides to turn on Q5 to power up the load. If this voltage drops by the specified hysteresis, it will shut off Q5. Different resistor values may be used for different desired supply levels. The resistors are also coupled to an over voltage pin 253 of the hot-swap chip 230.

In one embodiment, the hot-swap chip 230 senses the current through a sense resistor 250 coupled between bridge FET Q1-210 and Q2-212 outputs, and the source of an inrush FET Q5-252. Current through the sense resistor 250, approximately 7 milli-ohms in one embodiment, allows the hot-swap chip 230 to adjust the n-FET 252-Q5 gate drive 251 to control the circuit inrush current and thereby charge up the bulk capacitor 221 and start-up the downstream DC-DC converter 155.

Based on the ramp rate capacitor 256 and the sense resistor 250, the chip controls the inrush current. In continuing operation, the chip 230 monitors the supply voltages and the load current continually. In the event of a fault on the load, it will shut off Q5 via the GAT pin 251 within a few microseconds. As described above, if the supply voltage drops below the shutdown threshold at 244, the chip will shut off Q5. If there is an upstream fault that drops the supply voltage, then the same thing happens.

In one embodiment, a capacitor C1-254 coupled to the swap chip 230 sets a "try-again" time for fault conditions (overload-current), if needed. A capacitor C2-256 sets a dI/dt ramp rate for the inrush (soft-start) if needed. A FLT pin 258 is a fault alarm output. A pin PG at 260 is a power-good signal, which could be used to enable the DC-DC converter 155.

Figure 3:
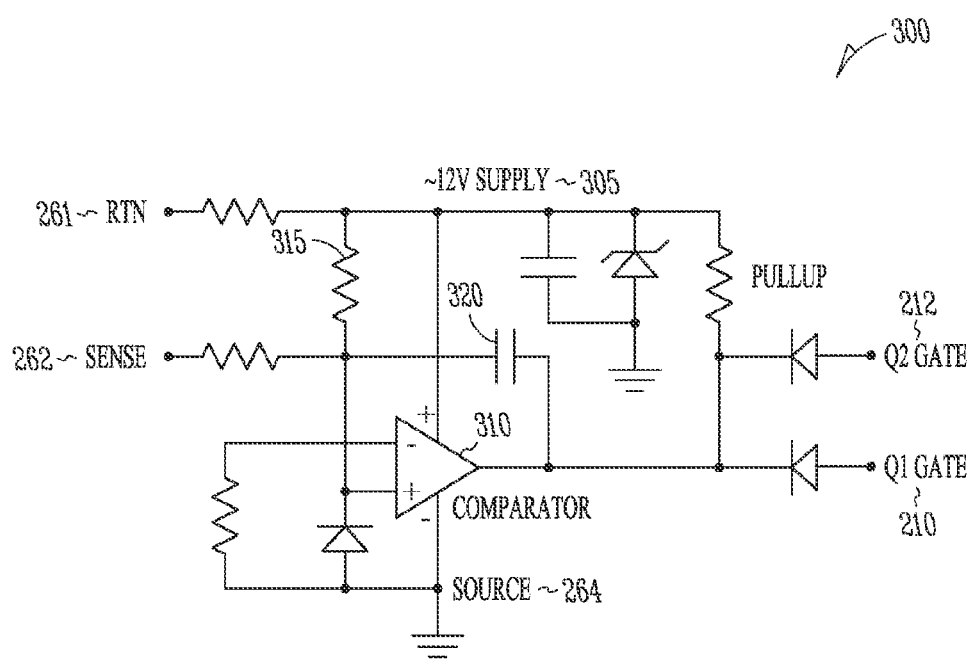
FIG. 3 is a circuit diagram of a comparator for operating with the circuit of FIG. 2 according to an example embodiment.

Once everything is powered up, the voltage drop between the supply 220 and the DC-DC converter 155 is very low and the input losses/dissipation are minimal. If the supply voltage drops out (i.e. the voltage at 220 is lower than that on capacitor 221), the current through the sense resistor will reverse. An added comparator circuit 300 in FIG. 3 will detect the reverse current and shut off both n-FETs Q1-210 and Q2-212 for a short time (a few ms), thus blocking the reverse current flow. When the supply voltage recovers, the Q1-210 or Q2-212 body diode will conduct once again, allowing power to flow into the circuit. After the comparator 300 times out, it will once again allow the hot-swap chip to turn on Q1-210 or Q2-212, returning the system to normal operation.

In further detail, comparator circuit 300 monitors the direction of the current flowing through sense resistor 250. The circuit is powered at a suitable voltage 305 derived from the supply at the RTN pin 261 of the hot-swap controller 230. Comparator 310 monitors the voltage difference between the Source 264 and Sense 262 pins of the controller. Resistor 315 ensures that the offset voltage of the comparator will not trigger a turn off under normal DC load conditions. The output of comparator 310 is coupled to gates of Q1-210 and Q2-212 through diodes so that the comparator cannot turn on either n-FET. Timing capacitor 320 keeps the comparator output low after the reverse current through sense resistor 250 is blocked when Q1-210 and Q2-212 are off.

Figure 4:
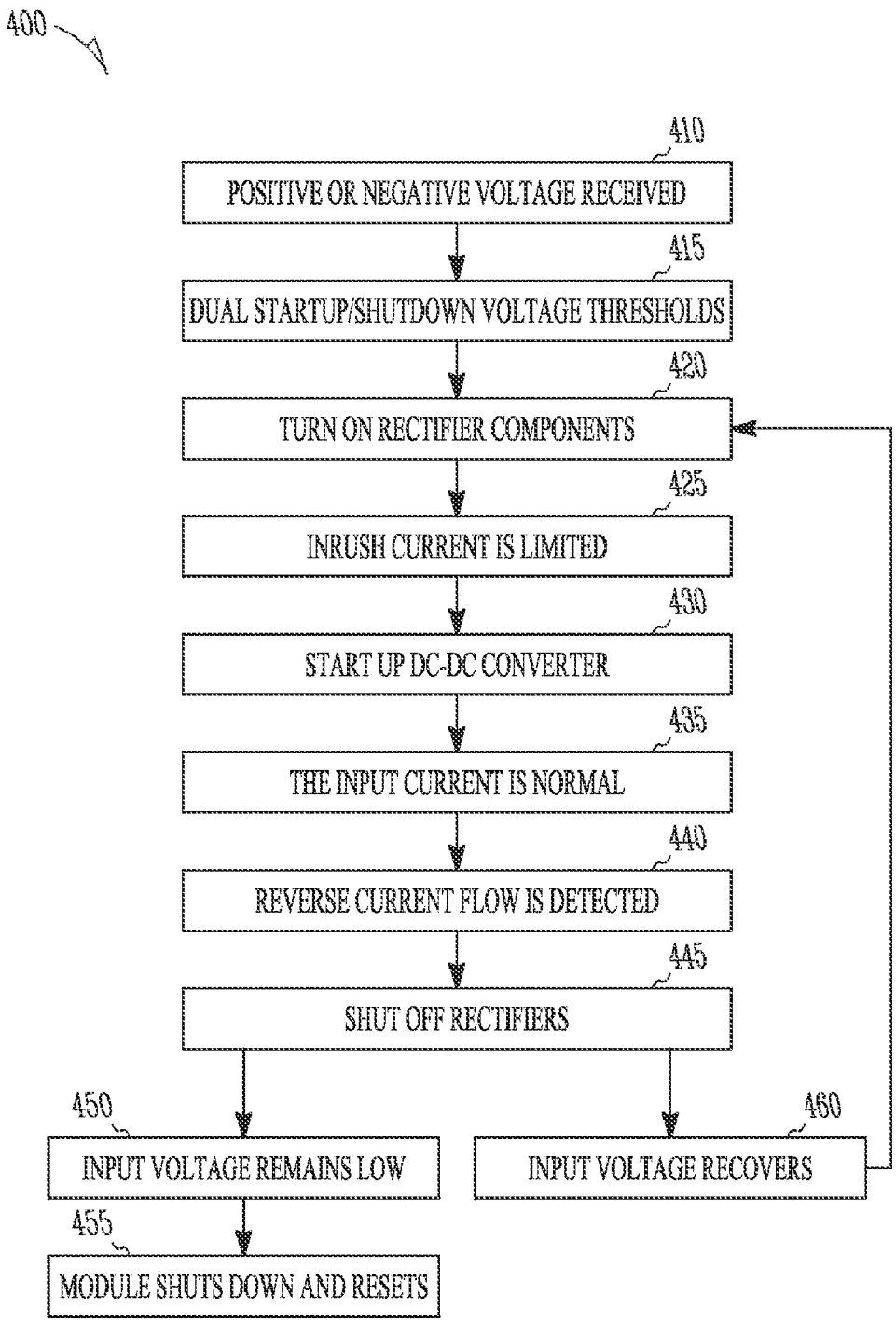
FIG. 4 is a flowchart illustrating a method of accepting dual voltages for a hot swap module according to an example embodiment.

A method 400 of hot-swapping a telecommunications (or other) module is described with respect to the flowchart in FIG. 4. Either a positive or negative voltage of the same or different absolute value are received at 410 and are rectified. Dual startup/shutdown voltage thresholds are provided at 415 and the appropriate rectifier components are turned on at 420 to reduce their voltage drops. If the voltage level is sufficient, the output is turned on and the inrush current is limited at 425 as the output voltage ramps up. At 430 the DC-DC converter starts up and the module load receives its power. Once the module is in normal operation at 435, the current flow is continually monitored at 440 to detect reverse current flow due to input voltage drop-out. In that event, the rectifiers are shut off at 445 to block the reverse flow. If the input voltage remains low in 450, the module will shut down and the hot-swap circuit will reset at 455. If the input voltage recovers during the module hold-up time at 460, then the hot-swap circuit will remain on and the sequence of events will recommence at 420.

In one embodiment, receiving either positive or negative voltages of different absolute values and rectifying such received voltages is provided by a power MOSFET bridge adapted to receive input voltages of approximately 24 volts and −48 volts. The FET bridge may be shut off as a function of detected reverse current flow. In a further embodiment, a controller circuit monitors current through a sense resistor and adjusts gate drive on the inrush FET to control the inrush current, to allow startup of a down stream DC-DC converter.

Various embodiments may have several advantages over previous circuits, such as fewer parts, reduced power loss, less room on the circuit card, and possibly less expensive. Some embodiments may also provide more precise inrush current limit control, and may also allow easier-to-calculate component values and simplification of the circuit design. In one embodiment, it may provide faster and better-defined response to anomalous conditions such as voltage drop-outs, and likely more precise and easier-to-calculate voltage thresholds. In further embodiment, the simpler overall and general approach can be used on other cards, or in systems with other voltage levels.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A hot swap circuit, comprising:
   a voltage sensor operable to sense an input supply voltage;
   a polarity corrector operable to provide a desired output polarity;
   a controller coupled to the voltage sensor and the polarity corrector, the controller being operable to set dual startup-shutdown thresholds; and
   a detector coupled to the polarity corrector, the detector being operable:
      to detect supply voltage drop-out; and
      to cause the polarity corrector to turn off in response to detection of supply voltage drop-out.

2. The hot swap circuit of claim 1, wherein the polarity corrector comprises a FET bridge.

3. The hot swap circuit of claim 2, wherein the bridge is adapted to receive input voltages of approximately 24 volts and −48 volts.

4. The hot swap circuit of claim 1, wherein the polarity corrector is adapted to receive input voltages of approximately 24 volts and −48 volts.

5. The hot swap circuit of claim 2, wherein the detector causes the bridge to turn off in response to detection of supply voltage drop-out.

6. The hot swap circuit of claim 5, wherein the detector comprises a sense resistor and a comparator having an input coupled to the sense resistor and an output coupled to two FETs in the bridge, the comparator being operable:
   to detect reverse current in the sense resistor; and
   to turn off the two FETs in response to detection of reverse current in the sense resistor.

7. The hot swap circuit of claim 6, wherein the controller includes an inrush FET coupled to the sense resistor and is operable:
   to sense current through the sense resistor; and
   to adjust gate drive on the inrush FET to control inrush current to allow startup of a downstream DC-DC converter.

8. The hot swap circuit of claim 5, wherein the controller is coupled to two FETs in the bridge and is operable:
   to turn on a first one of the two FETs in response to a first input supply voltage level at the voltage sensor; and
   to turn on a second one of the two FETs in response to a second input supply voltage level at the voltage sensor.

9. The hot swap circuit of claim 1, wherein the controller comprises a controller integrated circuit.

10. A method of hot-swapping an electronic module, comprising:
    applying an input supply voltage to a polarity corrector, the polarity corrector being operable to provide a desired supply voltage polarity;
    sensing the input supply voltage;
    setting dual startup-shutdown thresholds in response to the sensed input supply voltage; and
    in the event of supply voltage drop-out:
        detecting the supply voltage drop-out; and turning off the polarity corrector in response to detection of supply voltage drop-out.

11. The method of claim 10, comprising sensing polarity of the applied input supply voltage with a polarity sensing network.

12. The method of claim 11, wherein the polarity sensing network comprises a voltage divider.

13. The method of claim 10, further comprising performing a DC to DC conversion downstream of the polarity corrector.

14. The method of claim 10, wherein the polarity corrector comprises a FET bridge.

15. The method of claim 14, further comprising:
turning the FET bridge off in response to detecting a fault; and
turning the FET bridge back on after a predetermined delay.

16. The method of claim 14, wherein the detector comprises a sense resistor and a comparator having an input coupled to the sense resistor and an output coupled to two FETs in the bridge, the method comprising operating the comparator:
to detect reverse current in the sense resistor; and
to turn off the two FETs in response to detection of reverse current in the sense resistor.

17. The method of claim 16, further comprising sensing current through the sense resistance and adjusting gate drive on an inrush FET coupled to the sense resistance to allow startup of a downstream DC to DC converter.

* * * * *